United States Patent
Barzel et al.

(10) Patent No.: US 9,576,351 B1
(45) Date of Patent: Feb. 21, 2017

(54) STYLE TRANSFER FOR HEADSHOT PORTRAITS

(71) Applicant: Adobe Systems Incorporated, San Jose, CA (US)

(72) Inventors: Ronen Barzel, Edinburgh (GB); Sylvain Paris, Jamaica Plain, MA (US); Robert Bailey, Oakland, CA (US); Ian Sachs, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 14/946,004

(22) Filed: Nov. 19, 2015

(51) Int. Cl.
| | |
|---|---|
| G06K 9/54 | (2006.01) |
| G06T 5/50 | (2006.01) |
| G06T 5/40 | (2006.01) |
| G06T 3/00 | (2006.01) |
| G06T 11/60 | (2006.01) |

(52) U.S. Cl.
CPC ............ *G06T 5/50* (2013.01); *G06T 3/0006* (2013.01); *G06T 5/40* (2013.01); *G06T 11/60* (2013.01)

(58) Field of Classification Search
CPC ....... G06T 11/003; G06T 5/001; G06T 5/009; G06T 5/20; G06T 2207/20221; G06T 2207/20212; G06T 2207/20216; G06T 3/0056; G06T 7/0028; G06T 7/0042; G06T 7/0044; G06T 7/0097; H04N 21/23614; H04N 9/646; G06K 2009/6295; G06K 9/6232
See application file for complete search history.

(56) References Cited

PUBLICATIONS

Zhang et al.; "Stype transfer via image component analysis"; Nov. 2013; IEEE Transactions on multimedia, vol. 15, No. 7; pp. 1594-1601.*
Yamaguchi et al.; "Region-based painting style transfer"; Nov. 2-6, 2015; ACM SIGGRAPH Asia 2015 Technical Briefs Article No. 8.*
Yichang Shih et al., "Style Transfer for Headshot Portraits", ACM Transactions on Graphics (TOG), 33(4):148, 2014, 14 pages, (published before this application Nov. 2015).

* cited by examiner

*Primary Examiner* — Eueng-Nan Yeh
(74) *Attorney, Agent, or Firm* — Finch & Maloney PLLC

(57) ABSTRACT

Techniques are disclosed for automatically transferring a style of at least two reference images to an input image. The resulting transformation of the input image matches the visual styles of the reference images without changing the identity of the subject of the input image. Each image is decomposed into levels of detail with corresponding energy levels and a residual. A style transfer operation is performed at each energy level and residual using the reference image that most closely matches the input image at each energy level. The transformations of each level of detail and the residual of the input image are aggregated to generate an output image having the styles of the reference images. In some cases, the transformations are performed on the foreground of the input image, and the background can be transformed by an amount that is proportional to the aggregated transformations of the foreground.

20 Claims, 6 Drawing Sheets

STYLE TRANSFER FOR HEADSHOT PORTRAITS

FIELD OF THE DISCLOSURE

This disclosure relates generally to the field of digital image processing, and more particularly, to techniques for automatically transferring a style of at least one image, such as a headshot portrait, to another image.

BACKGROUND

Headshot portraits are a popular subject in photography. Professional photographers spend a great amount of time and effort to edit headshot photos and achieve a compelling style. Different styles will elicit different moods. For example, a high-contrast, black-and-white portrait may convey gravity, while a bright, colorful portrait will evoke a lighter atmosphere. However, the editing process to create such renditions requires advanced skills because features such as the eyes, the eyebrows, the skin, the mouth, and the hair all require specific treatment. In many instances, editing an image to achieve a compelling result involves maintaining a visually pleasing appearance while applying significant adjustments to the original image. Yet, the tolerance for errors is low because even certain small adjustments to the photograph can lead to undesirable results. Thus, advanced editing skills beyond the abilities of most casual photographers are needed to produce such renditions.

DETAILED DESCRIPTION

Figure 1:
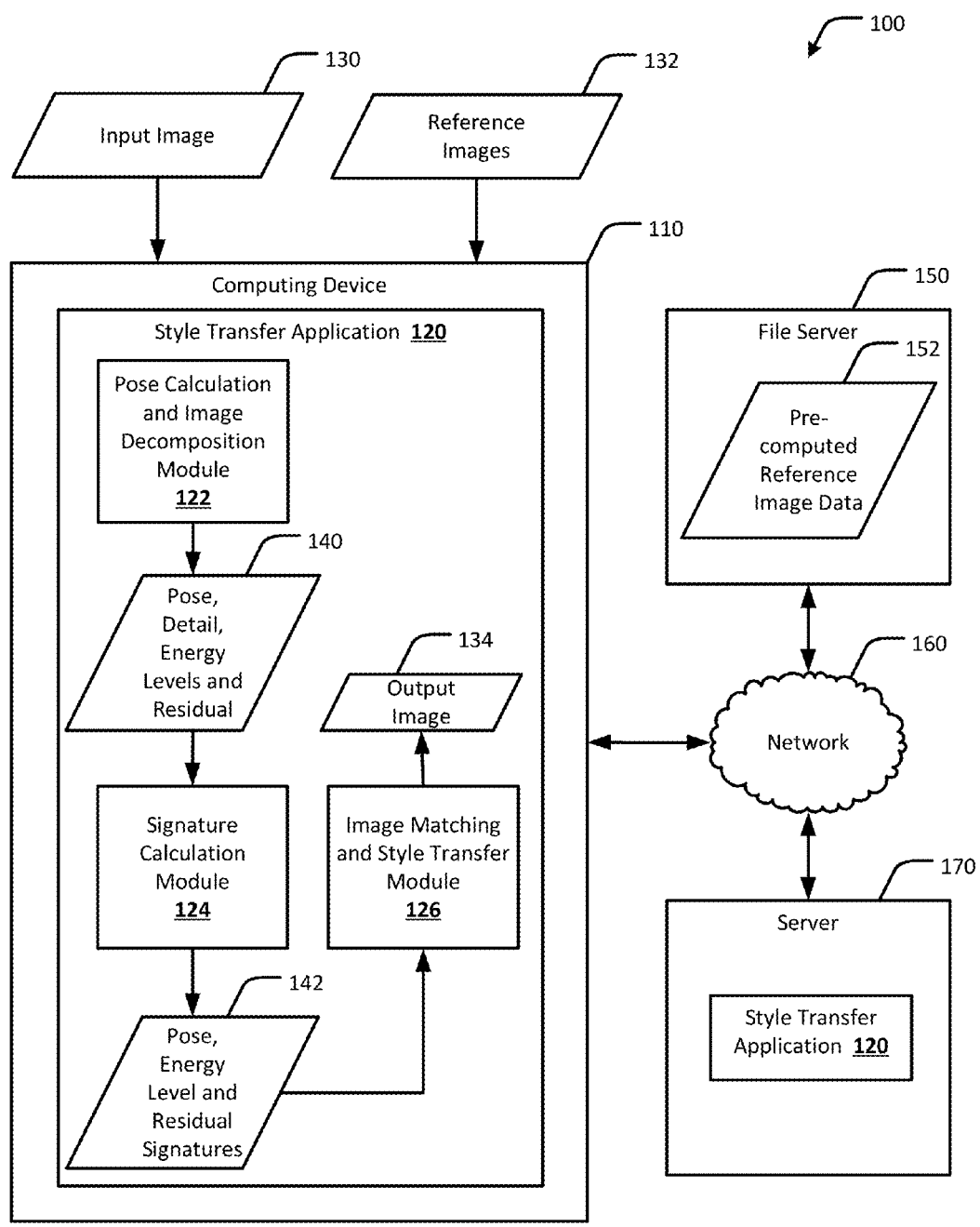
FIG. 1 shows an example system for automatically transferring a portrait style of a set of one or more images to another image, in accordance with an embodiment of the present disclosure.

There are instances where it is desirable to edit a portrait of a subject so that the stylistic appearance of the image resembles that of a set of one or more reference images, such as a set of professionally-prepared headshots, without changing the identity of the subject. The stylistic appearance may include, for example, lighting, contrast, texture, color and background effects that, in various combinations, add an artistic flavor to the portrait. However, from a technical perspective, editing headshots is challenging because edits are typically applied locally. For instance, hair does not receive the same treatment as skin, and even skin may be treated differently at different locations such as the forehead, cheeks, and chin. Further, lighting is critical to the appearance of the subject's face. For example, point light sources may generate a very different appearance than diffuse light sources, and similarly front lighting may generate a very different appearance than side lighting. Existing algorithms that automate the editing of generic photographs often perform poorly on headshots because they apply modifications to the image globally or otherwise ignore the specificities of headshot retouching, neglecting the effects on local variations in the image. Moreover, such algorithms attempt to use a single reference image to provide the best match, which can lead to undesirable compromises in cases where the single reference image does not match well in all aspects.

To this end, and in accordance with an embodiment of the present disclosure, techniques are disclosed for automatically transferring a style of at least two images, such as two or more reference images, to another image, such as an input image. The reference images contain one or more style features, such as lighting, contrast, color and texture features that are to be reproduced in the input image. In general, the visual appearance of the input image can be changed by decomposing the input image into several scales, manipulating the decomposition at each scale using the reference images, and then recombining the decompositions to produce an output image. In more detail, the input image and each of the reference images are decomposed into various scales, also known as levels of detail, by filtering each image with a series of low pass filters. At each level of detail, the local energy is computed. The local energy represents an estimate of how much the signal varies locally at a given scale. The computed energies at the various levels of detail are referred to in this disclosure as energy levels. Each energy level represents the visual appearance, or style, of the image at the corresponding level of detail. For example, finer levels of detail may capture skin texture, while coarser levels of detail may capture lighting and shadows. The final level of the decomposition is a residual component that represents overall style features not captured at the other energy levels, such as overall color and intensity. Next, a gain map is calculated from the energy level of the input image and the energy level of one of the reference images that most closely matches the input image at that level. A style transfer operation utilizes the gain map to transform the decomposition of the input image so that the energy level of the input image locally approximates the energy level of the reference image. In this way, a first reference image that most closely matches the input image at one energy level may be used to transfer, for example, fine details. Likewise, a second reference image that most closely matches the input image at another energy level may be used to transfer, for example, coarser details. Additionally, the residual component of the input image is transformed using, for example, a histogram transfer or a statistical transfer of a residual of a reference image that most closely matches the residual of the input image. The transformed decomposition at each level of detail, and the transformed residual of the input image, are then aggregated to generate an output image having the various style features of the reference images.

Note that each reference image can be used to modify a different aspect of the visual appearance of the input image. The style transfer operation is performed at each level of detail using the best matching reference image at the respective energy level to deal with the wide range of appearances that a face exhibits, from the fine-grain skin texture to the larger signal variations induced by the eyes, lips, and nose. The resulting transformation of the input image matches the various visual styles of the reference images without changing the identity of the subject of the input image. For instance, the transformed portrait represents the same person as the input with the same pose and expression, but with the color, texture distribution and overall lighting closely matching those of the reference portraits. In this way, the resulting output image can include the best matching features of multiple reference images. In some cases, the transformations described above are performed on the foreground region of the input image, which typically includes the subject of the portrait. In such cases, the background region of the input image can be transformed by an amount that is proportional to the aggregated transformations of the foreground region, according to some embodiments.

Embodiments of this disclosure are differentiated from techniques that use a single reference image to transform the style of a given input image. One difficulty with such single reference image techniques is that a given reference image has different characteristics at different scales, and even the best matching reference image is unlikely to match all of the characteristics of the input image (e.g., skin texture, bone structure, facial hair, eyewear, hair, skin tone and lighting). As a result, these techniques often produce unacceptable transformations of an input image by attempting to match to a reference image that may be very similar in some aspects but far too dissimilar in others. In contrast to such techniques, embodiments of the present disclosure provide techniques for transferring the styles of several different reference images onto the input image. The reference images that most closely match a given energy level of the input image are used to obtain different style effects. For example, various embodiments of the present disclosure transfer low frequency lighting effects of one reference image to the input image, and transfer high frequency texture effects of a different reference image to the input image, based on how closely a given energy level of the respective reference image matches the corresponding energy level of the input image. Since each match between the input image and one of the reference images is restricted to a particular energy level, it is more likely that a good match will be found for a particular style aspect than if a single reference image is used for all style aspects, thereby producing more pleasing results. Various embodiments of the present disclosure also differ from techniques in how the residual and background portions of the input image are transformed, as will be discussed in further detail below. Numerous configurations and variations will be apparent in light of this disclosure.

Example System

FIG. 1 shows an example system 100 for automatically transferring a style of at least two images to another image, in accordance with an embodiment of the present disclosure. The system 100 includes a computing device 110 configured to execute a style transfer application 120. The style transfer application 120 includes a pose calculation and image decomposition module 122, a signature calculation module 124, and an image matching and style transfer module 126. The style transfer application 120 is configured to receive data representing an input image 130 and two or more reference images 132, and to generate data representing an output image 134. The input image 130, each of the reference images 132, and the output image 134 may each include, for example, image data representing a headshot portrait of a subject having a foreground region and a background region, where the face of the subject forms the foreground. The input image 130, each of the reference images 132, and the output image 134 are all different from each other. For example, the input image 130 may include a portrait of a subject taken by a user, while each of the reference images 132 may include portraits of other subjects taken or edited by someone other than the user, such as a professional photographer or artist who has modified the image. Each of the reference images 132 may include one or more stylistic features relating to lighting, contrast, texture, color, background or other visual effects that alters the image from an original, unretouched state. The output image 132 may include, for example, data representing the input image as transformed by the stylistic features extracted from the reference images, such that the output image has the same subject as the input image but is modified to variously reproduce at least some of the stylistic features of the reference images (e.g., increased contrast, altered colors, reduced lighting, smoother textures, or other combinations of features).

In some embodiments, the system 100 includes a data communications network 160 (e.g., the Internet or an intranet) and a file server 150 that is in communication with the computing device 110 via the network 160. The file server 150 may host a database for storing pre-computed reference image data 152 (e.g., energy levels, residuals, canonical pose information and signature vectors), such as will be described in further detail below. In some such embodiments, the computing device 110 is configured to retrieve the pre-computed reference image data 152 from the file server 150 via the network 160. The pre-computed reference image data 152 can be used instead of, or in addition to, the reference images 132. In some embodiments, the system 100 includes a server 170 having a style transfer application 120, such as described herein. In such embodiments, the computing device 110 may include a client user interface that is connected across the network 160 to the server 170, and at least some computation may be performed on the server 170 (e.g., by the style transfer application 120), with images and other data transferred back and forth between the computing device 110 and the server 170.

Figure 2:
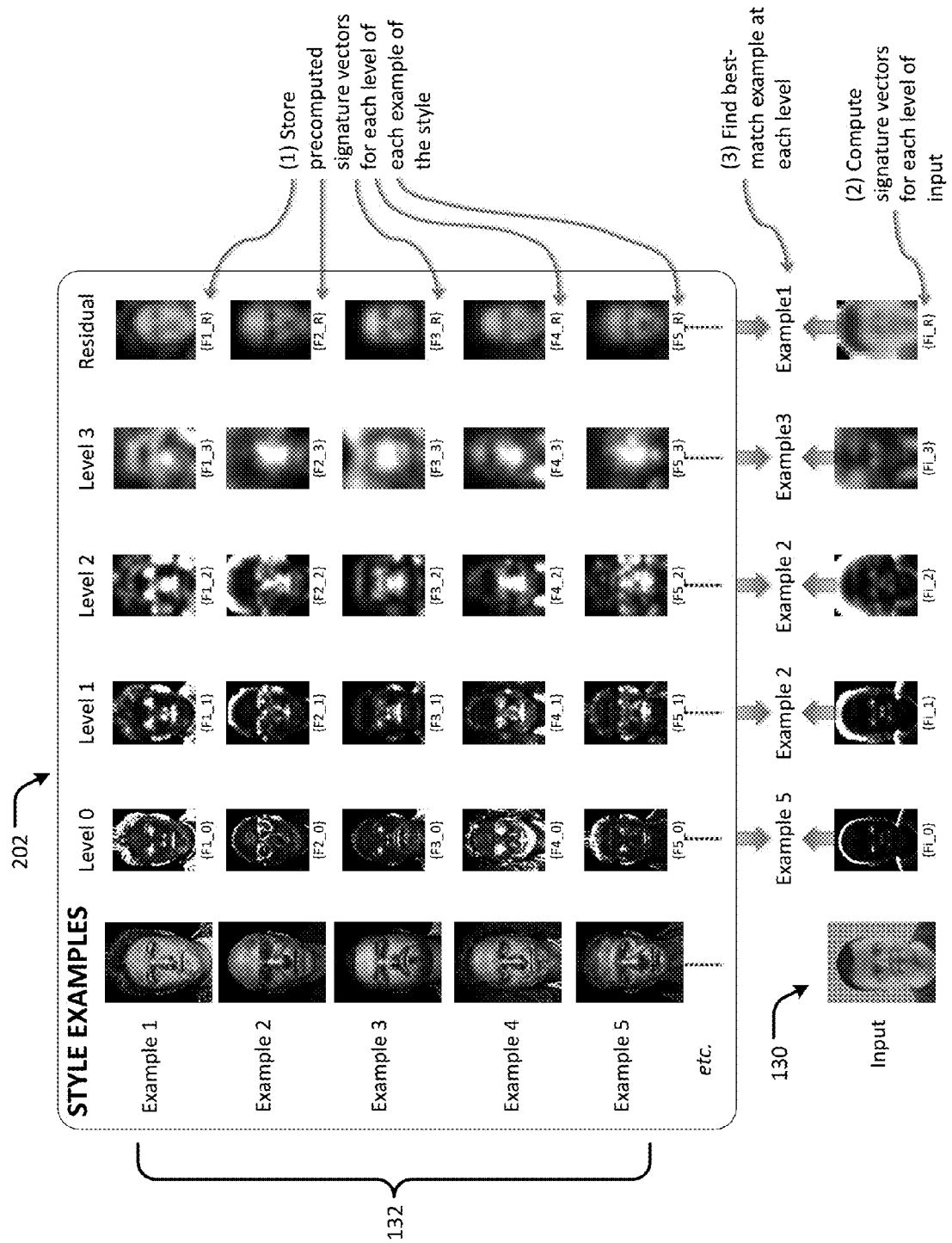
FIG. 2 shows an example of several images and the decompositions of each image at various energy levels as well as the process of finding matches at each level, in accordance with an embodiment of the present disclosure.

FIG. 2 shows an example of an input image 130, a set of reference images 132, and various energy levels of their decomposition 202, in accordance with an embodiment of the present disclosure. Each of the reference images 132 can belong to a set of images representing one or more particular style features. The reference images 132 in such a set may, for example, have similar lighting, contrast or texture features, although the images are different. The pose calculation and image decomposition module 122 of FIG. 1 is configured to decompose the input image 130 and each of the reference images 132 into data 140 representing a multiscale decomposition of the images into several levels of detail, corresponding energy levels and a residual, such as generally indicated at 202. It will be understood that the images can be decomposed into any number of levels of detail and corresponding energy levels (e.g., two levels, three levels, four levels, five levels, and so forth). As shown in FIG. 2, each of the images can be decomposed using, for example, a two-dimensional normalized Gaussian kernel of standard deviation a, such as follows:

$$L_l[I] = \begin{cases} I - I \otimes G(2) & \text{if } l = 0 \\ I \otimes G(2^l) - I \otimes G(2^{l+1}) & \text{if } l > 0 \end{cases}$$

$$R[I] = I \otimes G(2^n)$$

where $L_l[I]$ represents the decomposition levels of the input image 130, where G is a Gaussian function, where l represents the energy level (scale), and where R[I] represents the residual. The energy levels may be independently calculated for each level of the decomposed input 130 and reference images 132, for example, by averaging the square of the energy level coefficients. This generally provides an estimate of how much the signal locally varies at each energy level. For example, the energy level of a given image may be calculated as follows:

$$S_l[I] = L_l^2[I] \otimes G(2^{l+1})$$

where $S_l[I]$ represents the energy level at level l. These equations can also be used to compute the decomposition and energy levels of each of the reference images 132 and the output image 134.

Referring to FIGS. 1 and 2, the signature calculation module 124 is configured to align canonical feature poses of the input image 130 to the reference images 132 as discovered by the pose calculation and image decomposition module 122, and calculate local energy signatures 142, also referred to as signature vectors, for each of the aligned input 130 and reference images 132. The reference images 132 that define a particular style feature can be associated with a pre-defined canonical feature pose. Each feature pose represents the location of facial landmarks such eyes, nose, mouth, and chin. The canonical feature pose can be computed by averaging the feature pose of all of the reference images 132. The signature calculation module can align the landmarks of an image with the canonical pose by calculating an image morph that maps the location of each landmark to the canonical location. The image morph can be performed on the energy levels to align the energy levels accordingly. Once the landmarks are aligned, a signature vector can be created for each energy level or residual by concatenating the data of into a single linear vector.

In some embodiments, the data for the reference images 132, such as the energy levels, residuals, canonical pose, and signature vectors, can be pre-computed to produce a dataset (e.g., the pre-computed data 152 of FIG. 1) that represents the characteristics of a particular style. The dataset may be stored, for example, in a database locally or on a networked file server (e.g., the file server 150 of FIG. 1) for subsequent retrieval. In this manner, the reference image data need not be calculated each time the dataset is used for a style transfer operation. In some embodiments, multiple datasets representing reference images having several different portrait styles can be used in various combinations with the input image 130, so that a user can see different possible styles.

Figure 3:
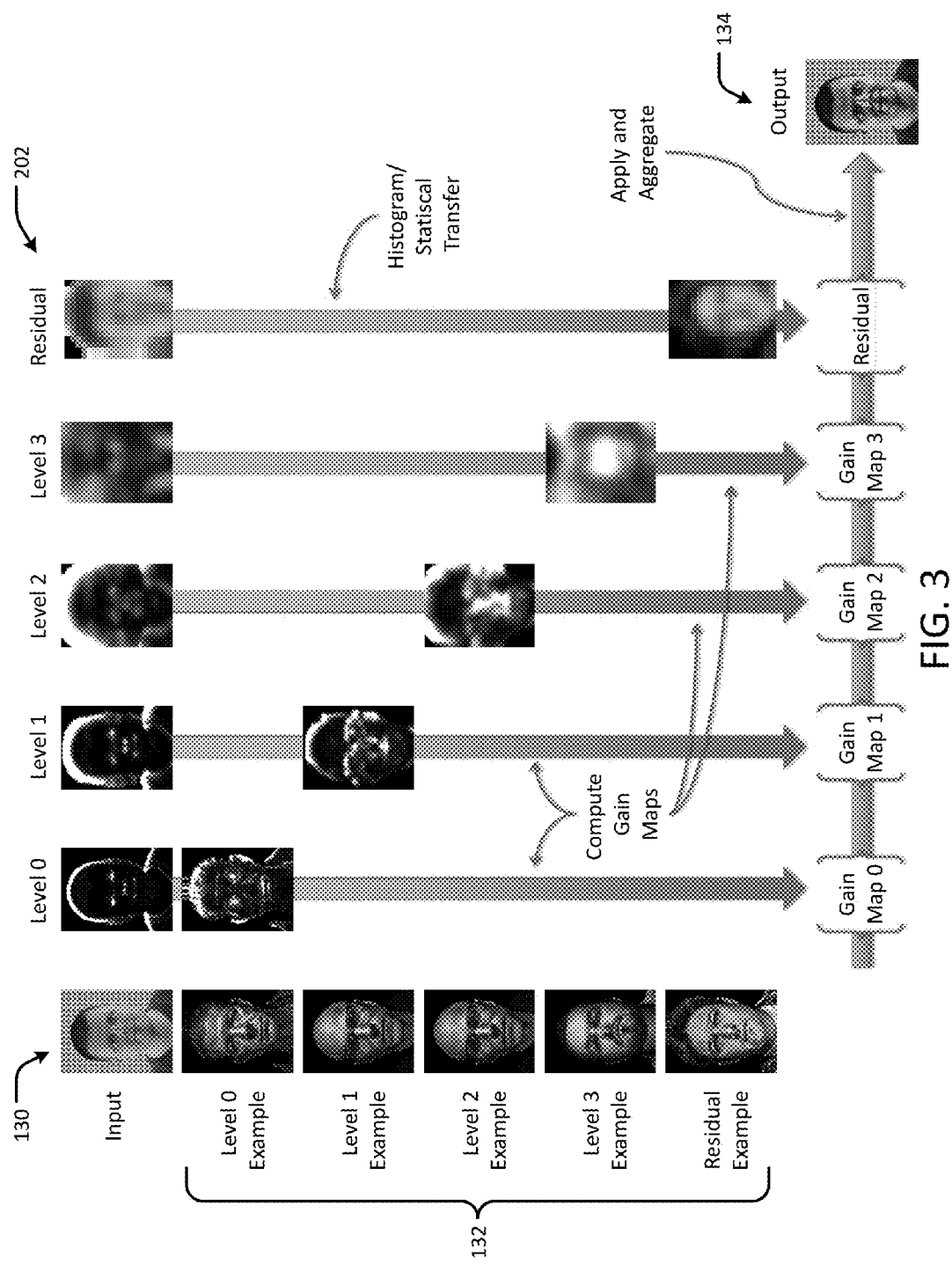
FIG. 3 is a pictorial representation of an example methodology for matching and transferring a portrait style of a set of images to another image, in accordance with an embodiment of the present disclosure.

FIG. 3 shows a pictorial example of a methodology for matching the reference images 132 to the foreground region of the input image 130, and for transferring the style of the reference images to the input image, thereby producing the output image 134, in accordance with an embodiment. The top row of FIG. 3 shows the input image 130, and four levels of energy and the residual 202 from the decomposition of the input image. The next five rows show examples of the desired style that best matches the input image 130 at each energy level and the residual 202. The bottom row shows gain maps and a new residual, which are applied to the decomposition levels of detail and residual of the input image 130 and aggregated to yield the output image 134. The resulting output image 134 has the style features transferred from the respective energy levels of the reference images 132.

The image matching and style transfer module 126 of FIG. 1 is configured to transfer one or more style features of the reference images 132 to the input image 130 using the signatures 142 of the aligned images generated by the signature calculation module 124. Although the signatures are computed and matched as aligned to the common pose of the reference images 132, the style transfer can be performed by aligning the energy levels of the reference images 132 to the pose of the input 130, which maintains the integrity of the input. The result of the transfer is the output image 134, which is the input image 130 transformed by the visual style or styles of the reference images 132 without changing the identity of the subject in the input image. In other words, the output image 134 represents the same person as the input image 130 with the same pose and expression, but with the color and texture distribution and overall lighting matching one or more of the reference images 132.

As shown in FIG. 3, the operations of the image matching and style transfer module 126 can be performed at each of the energy levels to deal with the wide range of appearances that a face exhibits, from the fine-grain skin texture to the larger signal variations induced by the eyes, lips and nose. Furthermore, as shown in FIG. 3, the style transfer operation can use different reference images 132 at each energy level (e.g., Level 0 Example for Level 0, Level 1 Example for Level 1, and so forth) as well as for the residual. Note that in some instances the same reference image 132 may be used for different energy levels (e.g., the Level 1 and Level 2 Examples of FIG. 3 are both decompositions of the same reference image). The transfer operation for a given level of detail of a given image (e.g., the input image 130 and the reference images 132) may, for example, be calculated as follows:

$$L_l[O] = L_l[I] \times \text{Gain map}$$

$$\text{Gain map} = \sqrt{\frac{S_l[E]}{S_l[I] + \varepsilon}}$$

where $\varepsilon$ is a small number to avoid division by zero (e.g., $0.01^2$). Each transfer can be independently performed in the pose of the input image 130, with the energy level signatures of the reference images 132 morphed to the pose of input image 130. A mask can be applied to the input image 130 to limit the transfer operations to the foreground regions containing, for example, the face of the subject, so that the background region is not modified at this stage in the process.

For the residual L (intensity) channel, a histogram transfer can be performed. The histogram of the intensity values captures the overall lightness, darkness, and contrast in an image. The histogram of the reference image residual is computed, and a histogram matching algorithm is applied to the input image residual so that the histogram of the input image residual matches the histogram of the reference image residual. The histogram matching results in the input image having its overall lighting and contrast adjusted to match the reference image, but the spatial location of highlights and shadows in the input image are not affected.

For the residual a, b (color) channels, a statistical transfer can be performed. The mean and standard deviation of the a and b channels of the reference image residual are calculated, and a linear affine transformation is performed on the a and b channels of the input image residual so that the a and b channels of the input image residual have the same mean and standard deviation as the a and b channels of the reference image residual. This results in the input image having the same average color and range of color variation as the example, but the spatial distribution of the colors is not affected. It will be understood that the techniques variously described with respect to the image matching and style transfer operations are examples, and that other techniques for matching images and transferring the style features can be utilized.

Figure 4:
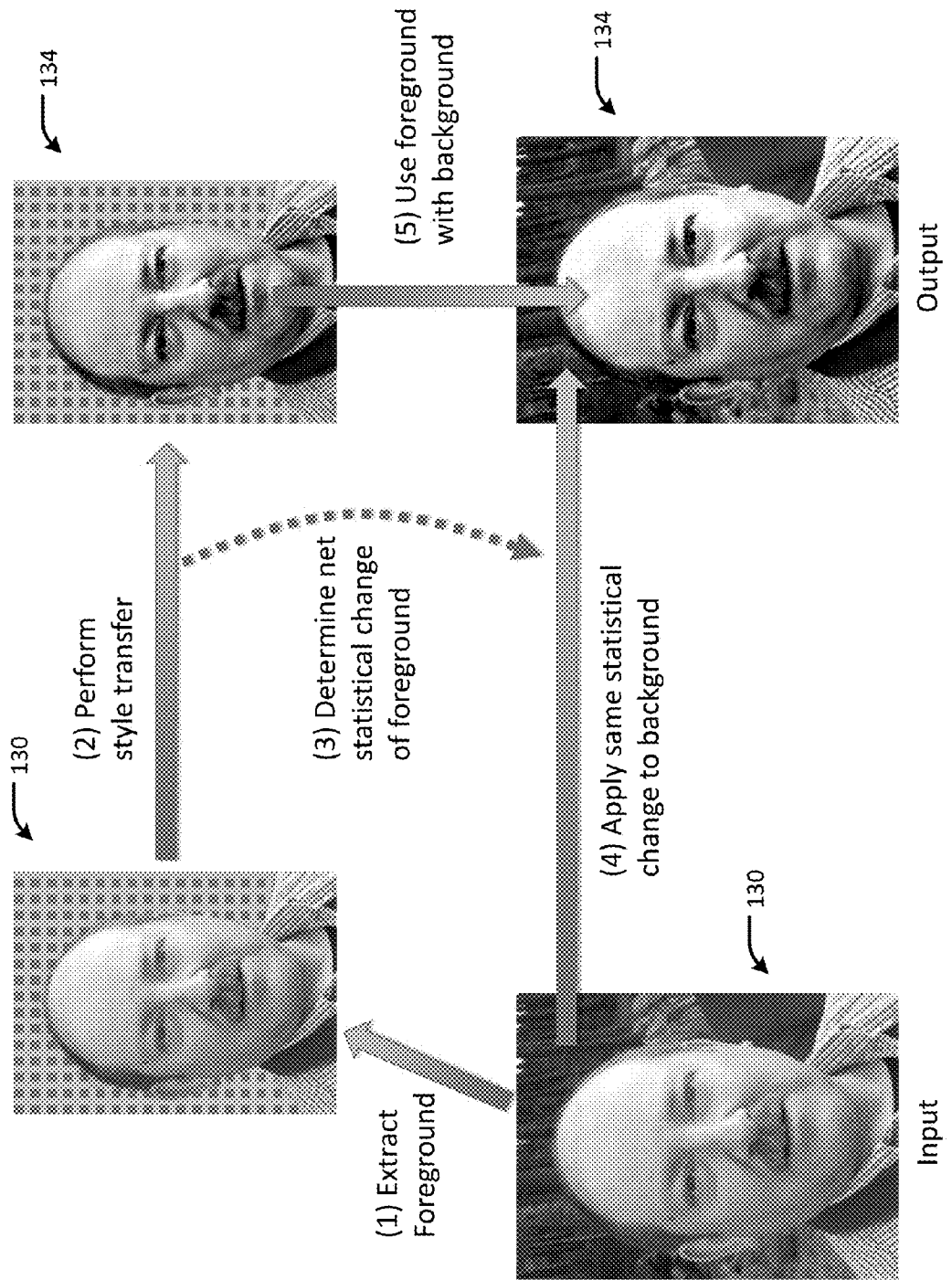
FIG. 4 is a pictorial representation of an example methodology for transferring a background region style of a set of images to another image, in accordance with an embodiment of the present disclosure.

FIG. 4 shows a pictorial example of a methodology for transferring the background region of the reference images 132 to the input image 130, in accordance with an embodiment. In summary, for a given input image, the style of one or more reference images can be transferred to the foreground region of the output image 134, such as described above with respect to FIGS. 1-3. For the background region of the input image 130, the image matching and style transfer module 126 of FIG. 1 is configured to separate the background region from the foreground region of the input image 130, calculate the net statistical change (e.g., the change in mean and standard deviation) between the foreground region of the input image 130 and the foreground region of the output image 134, and perform a linear affine transformation on the background region of the input image 130 so that the mean and standard deviation of the background changes by the same factor as the mean and standard deviation of the foreground. In this way, the original background texture and detail is maintained, but its overall color and lighting correspond with the transformed foreground. In some embodiments, the user is provided with an option to use the background of any of the reference images 132, the original background of the input image 130, the transformed background of the output image 134, a solid average color of any of those, or any blend or other combination of those options.

Example Style Transfer Methodology

Figure 5:
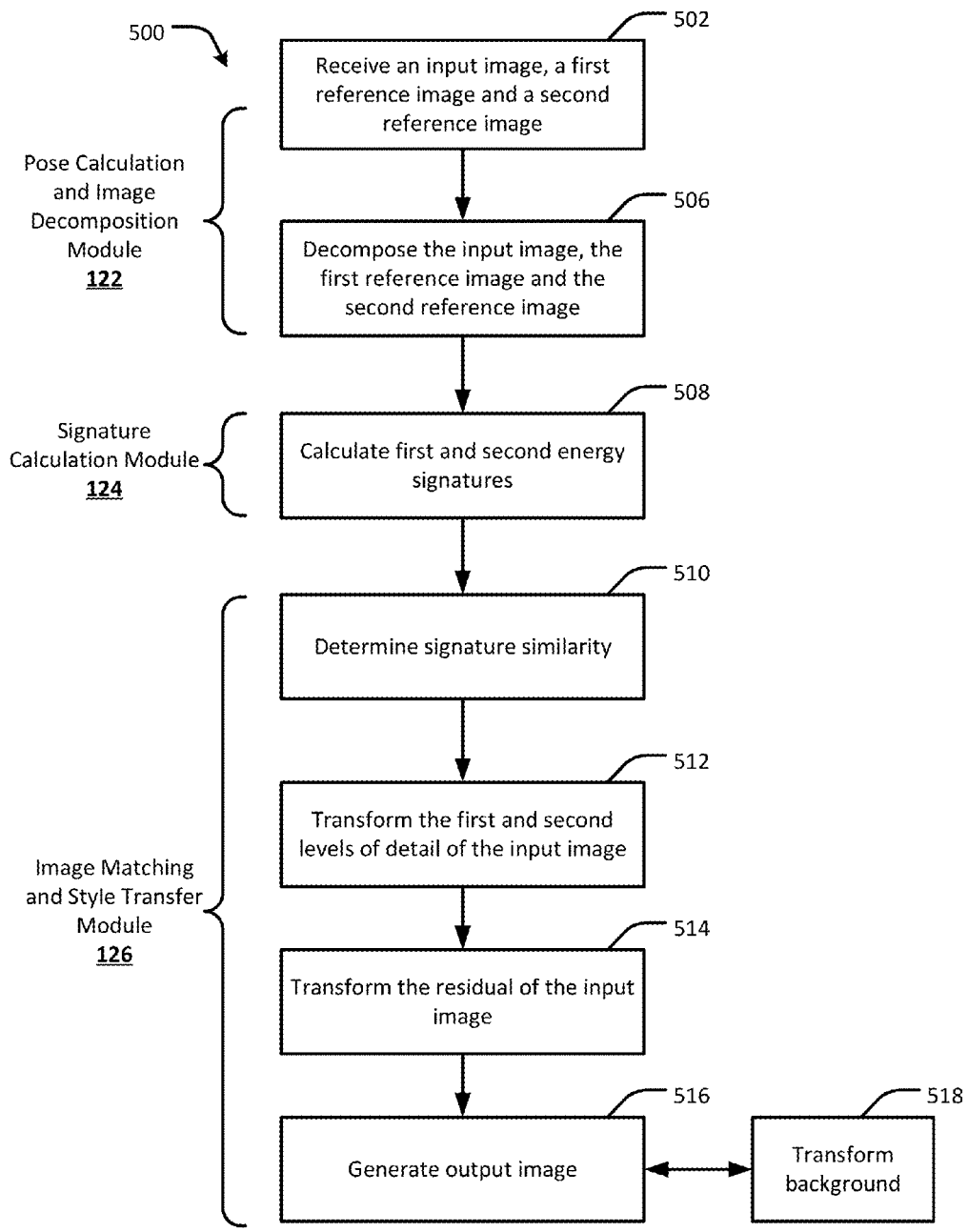
FIG. 5 is a flow diagram of an example methodology for transferring a portrait style of a set of images to another image, in accordance with an embodiment of the present disclosure.

FIG. 5 is a flow diagram of an example methodology 500 for transferring a style of at least two images to another image, in accordance with an embodiment of the present disclosure. Various aspects of the method 500 may be implemented, for example, in the computing device 110 of FIG. 1. The method 500 begins by receiving 502 input data representing an input image (e.g., input image 130 of FIG. 1), a first reference image and a second reference image (e.g., reference images 132 of FIG. 1). It will be understood that any number of reference images can be received and utilized. The reference images may, for example, form a set representing a particular style or set of style features that the user wishes to transfer to the input image. The input image and each of the reference images can be different than each another, such as described above with respect to FIGS. 2 and 3. The method 500 continues by decomposing 506 each of the images (e.g., the input image, the first reference image, the second reference image, and any additional reference images) into at least a first decomposition level (a level of detail), a second decomposition level, and a corresponding first energy level and second energy level, as well as a residual (e.g., the level of detail, energy level and residual data 140 of FIG. 1). It will be understood that the images can be decomposed into any number of levels of detail and energy levels, such as shown, for example, in FIG. 2 (e.g., two levels, three levels, four levels, five levels, and so forth). In some embodiments, data representing the decomposed reference images (e.g., energy levels, residuals, canonical pose, and signature vectors) can be pre-computed and stored in a dataset. In such embodiments, the method may utilize the pre-computed reference image data instead of calculating it for each input image.

In some embodiments, the method 500 includes calculating 508 a first energy signature for the first energy level of the input image, the first reference image and the second reference image, as well as for any additional reference images (e.g., the energy level data 142 of FIG. 1). Similarly, a second energy signature can be calculated for the second energy level, a third energy signature for a third energy level (if any), and so on for each of the energy levels in each of the decomposed images, as well as for the residuals of each image. As noted above, in some embodiments the signatures for the reference images can be pre-computed. The method 500 may further include determining 510 whether the first energy signature of the input image is more similar to the first energy signature of the first reference image than the first energy signature of the second reference image, and likewise determining whether the second energy signature of the input image is more similar to the second energy signature of the second reference image than the second energy signature of the first reference image, and so on for each of the energy levels and the residuals. In this manner, the reference image that is most similar to the input image at each energy level and residual can be utilized, since different reference images may have more similar signatures to the input image at some energy levels than at other energy levels, as compared to other reference images. For example, referring to FIG. 3, one reference image (Level 0 Example) may be most similar to the input image at Level 0, while another reference image may be most similar to the input image at Levels 1 and 2 (Level 1 Example and Level 2 Example).

Once the signature similarities have been determined, the method 500 continues by transforming 512 the first decomposition level of the input image based on the first energy of the input image and first energy level of the first reference image, and transforming the second decomposition level of the input image based on the second energy level of the input image and second energy level of the second reference image. If there are additional energy levels, the process is similar for transforming each corresponding level of the input image. In some embodiments, the each level of the input image is transformed independently of one or more other energy levels in the input image. In some embodiments, the transforming 512 of the input image includes calculating a gain map for each of the energy levels of the input image based on the local signal variation for the respective levels, where the transforming of the decomposition levels of the input image is a function of the gain map, such as described above. The method 500 continues by transforming 514 the residual of the input image based on the residual of a third reference image, which may be the same or different than the first and second reference images, depending on the residual signature similarities. In some embodiments, the transforming 514 of the input image includes transforming at least a portion of the residual in the input image using histogram matching (e.g., for the intensity channel), a linear affine transformation (e.g., for the a, b color channels), or both.

The method 500 continues by generating 516 output data (e.g., output image 134 of FIG. 1) representing an output image by aggregating the transformed first decomposition level of the input image and the transformed second decomposition level of the input image, as well as any additional decomposition levels of the input image. In some embodiments, the method 500 includes transforming 518 a background region of the output image by separating a foreground region of the input image from the background region of the input image, calculating a mean and a standard deviation of a change in the foreground region (e.g., a change between the original input image and the transformed output image), and transforming the background region of the output image by the mean and the standard deviation of the change in the foreground region.

Example Computing Device

Figure 6:
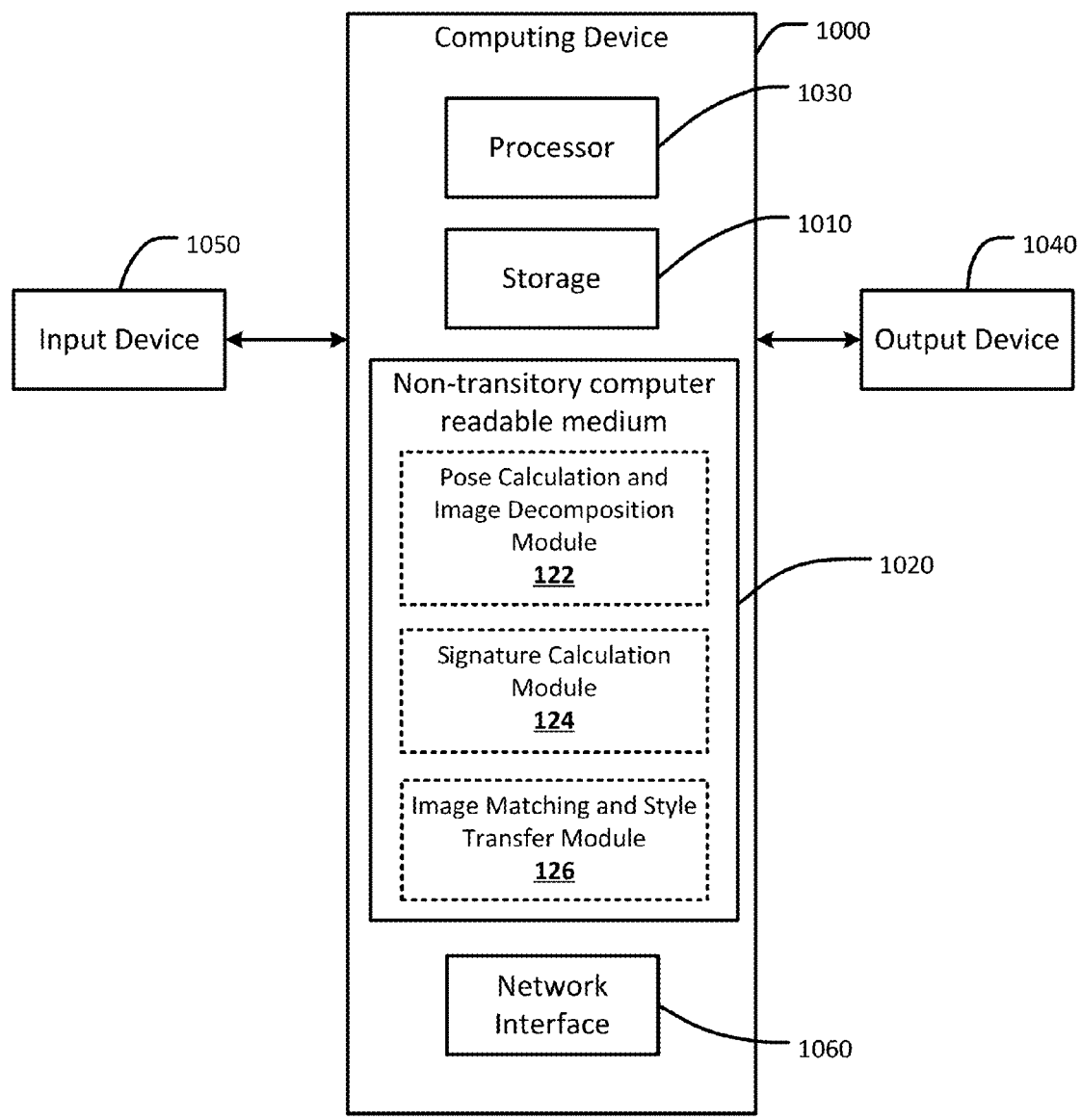
FIG. 6 is a block diagram representing an example computing device that may be used to perform any of the techniques as variously described in this disclosure, in accordance with an embodiment of the present disclosure.

FIG. 6 is a block diagram representing an example computing device 1000 that may be used to perform any of the techniques as variously described in this disclosure. For example, the system 100 of FIG. 1, or any portions thereof, and the methodologies of FIG. 5, or any portions thereof, may be implemented in the computing device 1000. The computing device 1000 may be any computer system, such as a workstation, desktop computer, server, laptop, handheld computer, tablet computer (e.g., the iPad™ tablet computer), mobile computing or communication device (e.g., the iPhone™ mobile communication device, the Android™ mobile communication device, and the like), or other form of computing or telecommunications device that is capable of communication and that has sufficient processor power and memory capacity to perform the operations described in this disclosure. A distributed computational system may be provided comprising a plurality of such computing devices.

The computing device 1000 includes one or more storage devices 1010 and/or non-transitory computer-readable media 1020 having encoded thereon one or more computer-executable instructions or software for implementing techniques as variously described in this disclosure. The storage devices 1010 may include a computer system memory or random access memory, such as a durable disk storage (which may include any suitable optical or magnetic durable storage device, e.g., RAM, ROM, Flash, USB drive, or other semiconductor-based storage medium), a hard-drive, CD-ROM, or other computer readable media, for storing data and computer-readable instructions and/or software that implement various embodiments as taught in this disclosure. The storage device 1010 may include other types of memory as well, or combinations thereof. The storage device 1010 may be provided on the computing device 1000 or provided separately or remotely from the computing device 1000. The non-transitory computer-readable media 1020 may include, but are not limited to, one or more types of hardware memory, non-transitory tangible media (for example, one or more magnetic storage disks, one or more optical disks, one or more USB flash drives), and the like. The non-transitory computer-readable media 1020 included in the computing device 1000 may store computer-readable and computer-executable instructions or software for implementing various embodiments. The computer-readable media 1020 may be provided on the computing device 1000 or provided separately or remotely from the computing device 1000.

The computing device 1000 also includes at least one processor 1030 for executing computer-readable and computer-executable instructions or software stored in the storage device 1010 and/or non-transitory computer-readable media 1020 and other programs for controlling system hardware. Virtualization may be employed in the computing device 1000 so that infrastructure and resources in the computing device 1000 may be shared dynamically. For example, a virtual machine may be provided to handle a process running on multiple processors so that the process appears to be using only one computing resource rather than multiple computing resources. Multiple virtual machines may also be used with one processor.

A user may interact with the computing device 1000 through an output device 1040, such as a screen or monitor, which may display one or more user interfaces provided in accordance with some embodiments. The output device 1040 may also display other aspects, elements and/or information or data associated with some embodiments. The computing device 1000 may include other I/O devices 1050 for receiving input from a user, for example, a keyboard, a joystick, a game controller, a pointing device (e.g., a mouse, a user's finger interfacing directly with a display device, etc.), or any suitable user interface. The computing device 1000 may include other suitable conventional I/O peripherals. The computing device 1000 can include and/or be operatively coupled to various suitable devices for performing one or more of the aspects as variously described in this disclosure, such as digital cameras for acquiring digital images and video displays for displaying digital images.

The computing device 1000 may run any operating system, such as any of the versions of Microsoft® Windows® operating systems, the different releases of the Unix and Linux operating systems, any version of the MacOS® for Macintosh computers, any embedded operating system, any real-time operating system, any open source operating system, any proprietary operating system, any operating systems for mobile computing devices, or any other operating system capable of running on the computing device 1000 and performing the operations described in this disclosure. In an embodiment, the operating system may be run on one or more cloud machine instances.

In other embodiments, the functional components/modules may be implemented with hardware, such as gate level logic (e.g., FPGA) or a purpose-built semiconductor (e.g., ASIC). Still other embodiments may be implemented with a microcontroller having a number of input/output ports for receiving and outputting data, and a number of embedded routines for carrying out the functionality described in this disclosure. In a more general sense, any suitable combination of hardware, software, and firmware can be used, as will be apparent.

As will be appreciated in light of this disclosure, the various modules and components of the system, such as the style transfer application 120, the pose calculation and image decomposition module 122, the signature calculation module 124, the image matching and style transfer module 126, or any combination of these, can be implemented in software, such as a set of instructions (e.g., HTML, XML, C, C++, object-oriented C, JavaScript, Java, BASIC, etc.) encoded on any computer readable medium or computer program product (e.g., hard drive, server, disc, or other suitable non-transient memory or set of memories), that when executed by one or more processors, cause the various methodologies provided in this disclosure to be carried out. It will be appreciated that, in some embodiments, various functions and data transformations performed by the user computing system, as described in this disclosure, can be performed by similar processors and/or databases in different configurations and arrangements, and that the depicted embodiments are not intended to be limiting. Various components of this example embodiment, including the computing device 1000, can be integrated into, for example, one or more desktop or laptop computers, workstations, tablets, smart phones, game consoles, set-top boxes, or other such computing devices. Other componentry and modules typical of a computing system, such as processors (e.g., central processing unit and co-processor, graphics processor, etc.), input devices (e.g., keyboard, mouse, touch pad, touch screen, etc.), and operating system, are not shown but will be readily apparent.

Numerous embodiments will be apparent in light of the present disclosure, and features described herein can be combined in any number of configurations. One example embodiment provides a computer-implemented method for transferring a style of at least two images to another image. The method includes receiving, by a computer processor, input data representing an input image, a first reference image and a second reference image; decomposing, by the computer processor and based on the input data, the input image into data representing a first level of detail and a second level of detail and a corresponding first energy level and second energy level; transforming, by the computer processor, the first level of detail the input image based on a pre-computed first energy level of the first reference image; transforming, by the computer processor, the second level of detail of the input image based on a pre-computed second energy level of the second reference image; and generating, by the computer processor, output data representing an output image by aggregating the transformed first levels of detail of the input image and the transformed second level of detail of the input image. The input image, the first reference image and the second reference image may be different than each another. In some cases, the first and second levels of detail and energy levels of the first and second reference images are computed based on decompositions of those images, which may be pre-computed. In some cases, the first level of detail of the input image is transformed independently of the second level of detail of the input image. In some cases, the method includes calculating, by the computer processor, a first energy signature for the first energy level of the input image; and calculating, by the computer processor, a second energy signature for the second energy level of the input image. In some such cases, the method includes determining, by the computer processor and prior to generating the output data, that the first energy signature of the input image is more similar to a pre-computed first energy signature of the first reference image than a pre-computed first energy signature of the second reference image. In some other such cases, the method includes determining, by the computer processor and prior to generating the output data, that the second energy signature of the input image is more similar to a pre-computed second energy signature of the second reference image than a pre-computed second energy signature of the first reference image. In some cases, the transforming of the first level of detail of the input image and the transforming of the second level of detail of the input image each further include calculating, by the computer processor, energy levels based on a local signal variation within each of the levels of detail of each of the input image, the first reference image and the second reference image based; and calculating, by the computer processor, a gain map for each of the first and second levels of detail of the input image based on the energy levels for the respective levels, where the transforming of the first and second levels of detail of the input image is a function of the gain map. In some cases, the method includes receiving, by a computer processor, further input data representing a third reference image; decomposing, by the computer processor, each of the input image and the third reference image into a residual based on the further input data; and transforming, by the computer processor, at least a portion of the residual in the input image based on the residual in the third reference image, where the generating of the output data further comprises aggregating the transformed residual of the input image. In some such cases, the transforming of at least the portion of the residual in the input image uses histogram matching or a linear affine transformation. In some cases, the method includes separating, by the computer processor, a foreground region of the input image and a background region of the input image based on the input data; calculating, by the computer processor, a mean and a standard deviation of a change in the foreground region based on the output data; and transforming, by the computer processor, the background region by the mean and the standard deviation of the change in the foreground region.

Another example embodiment provides a system including a storage and a computer processor operatively coupled to the storage. The computer processor is configured to execute instructions stored in the storage that when executed cause the computer processor to carry out a process. The process includes receiving input data representing each of an input image, a first reference image and a second reference image, the input image, the first reference image and the second reference image being different than each another; decomposing, based on the input data, each of the input image, the first reference image and the second reference image into data representing a first energy level and a second energy level and a corresponding first energy level and second energy level; transforming the first level of detail of the input image based on the first energy level of the first reference image; transforming the second level of detail of the input image based on the second energy level of the second reference image; and generating output data representing an output image by aggregating the transformed first level of detail of the input image and the transformed second level of detail of the input image. In some cases, the first level of detail of the input image is transformed independently of the second level of detail of the input image. In some cases, the process includes calculating a first energy signature for each of the first energy level of the input image, the first energy level of the first reference image and the first energy level of the second reference image; and calculating a second energy signature for each of the second energy level of the input image, the second energy level of the first reference image and the second energy level of the second reference image. In some such cases, the process includes determining, prior to generating the output data, that the first energy signature of the input image is more similar to the first energy signature of the first reference image than the first energy signature of the second reference image. In some other such cases, the process includes determining, prior to generating the output data, that the second energy signature of the input image is more similar to the second energy signature of the second reference image than the second energy signature of the first reference image. In some cases, the transforming of the first energy level of the input image and the transforming of the second energy level of the input image each further include calculating the first and second energy levels based on a local signal variation within each of the levels of detail of each of the input image, the first reference image and the second reference image based; and calculating a gain map for each of the first and second levels of detail of the input image based on the respective first and second energy levels, where the transforming of the first and second levels of detail of the input image is a function of the gain map. In some cases, the process includes receiving further input data representing a third reference image; decomposing each of the input image and the third reference image into a residual based on the further input data; and transforming at least a portion of the residual in the input image based on the residual in the third reference image, where the generating of the output data further comprises aggregating the transformed residual of the input image. In some such cases, the transforming of at least the portion of the residual in the input image uses histogram matching or a linear affine transformation. In some cases, the process includes separating a foreground region of the input image and a background region of the input image based on the input data; calculating a mean and a standard deviation of a change in the foreground region based on the output data; and transforming the background region by the mean and the standard deviation of the change in the foreground region. Another example embodiment provides a non-transient computer program product having instructions encoded thereon that when executed by one or more processors cause a process to be carried out for performing one or more of the aspects variously described in this paragraph.

The foregoing description and drawings of various embodiments are presented by way of example only. These examples are not intended to be exhaustive or to limit the invention to the precise forms disclosed. Alterations, modifications, and variations will be apparent in light of this disclosure and are intended to be within the scope of the invention as set forth in the claims.

What is claimed is:

1. A computer-implemented method for transferring a style of at least two images to another image, the method comprising:
    receiving, by a computer processor, input data representing each of an input image, a first reference image and a second reference image, the first reference image and the second reference image being different than each another;
    decomposing, by the computer processor and based on the input data, the input image into data representing a first level of detail and a second level of detail and a corresponding first energy level and second energy level;
    transforming, by the computer processor, the first level of detail the input image based on a pre-computed first energy level of the first reference image;
    transforming, by the computer processor, the second level of detail of the input image based on a pre-computed second energy level of the second reference image; and
    generating, by the computer processor, output data representing an output image by aggregating the transformed first level of detail of the input image and the transformed second level of detail of the input image.

2. The method of claim 1, wherein the first level of detail of the input image is transformed independently of the second level of detail of the input image.

3. The method of claim 1, further comprising:
    calculating, by the computer processor, a first energy signature for the first energy level of the input image; and
    calculating, by the computer processor, a second energy signature for the second energy level of the input image.

4. The method of claim 3, further comprising:
    determining, by the computer processor and prior to generating the output data, that the first energy signature of the input image is more similar to a pre-computed first energy signature of the first reference image than a pre-computed first energy signature of the second reference image.

5. The method of claim 3, further comprising:
    determining, by the computer processor and prior to generating the output data, that the second energy signature of the input image is more similar to a pre-computed second energy signature of the second reference image than a pre-computed second energy signature of the first reference image.

6. The method of claim 1, wherein the transforming of the first level of detail of the input image and the transforming of the second level of detail of the input image each further comprise:
    calculating, by the computer processor, energy levels based on a local signal variation within each of the levels of detail of each of the input image, the first reference image and the second reference image based; and
    calculating, by the computer processor, a gain map for each of the first and second levels of detail of the input image based on the energy levels for the respective levels, wherein the transforming of the first and second levels of detail of the input image is a function of the gain map.

7. The method of claim 1, further comprising:
    receiving, by a computer processor, further input data representing a third reference image;
    decomposing, by the computer processor, each of the input image and the third reference image into a residual based on the further input data; and
    transforming, by the computer processor, at least a portion of the residual in the input image based on the residual in the third reference image,
    wherein the generating of the output data further comprises aggregating the transformed residual of the input image.

8. The method of claim 7, wherein the transforming of at least the portion of the residual in the input image uses at least one of histogram matching and a linear affine transformation.

9. The method of claim 1, further comprising:
    separating, by the computer processor, a foreground region of the input image and a background region of the input image based on the input data;
    calculating, by the computer processor, a mean and a standard deviation of a change in the foreground region based on the output data; and
    transforming, by the computer processor, the background region by the mean and the standard deviation of the change in the foreground region.

10. In a digital image processing environment, a system comprising:
    a storage; and
    a computer processor operatively coupled to the storage, the computer processor configured to execute instructions stored in the storage that when executed cause the computer processor to carry out a process comprising:
        receiving input data representing each of an input image, a first reference image and a second reference image, the first reference image and the second reference image being different than each another;
        decomposing, based on the input data, each of the input image, the first reference image and the second reference image into a first level of detail and a second level of detail level and a second energy level and a corresponding first energy level and second energy level;

transforming the first level of detail of the input image based on the first energy level of the first reference image;

transforming the second level of detail of the input image based on the second energy level of the second reference image; and generating output data representing an output image by aggregating the transformed first level of detail of the input image and the transformed second level of detail of the input image.

11. The system of claim 10, wherein the first level of detail of the input image is transformed independently of the second level of detail of the input image.

12. The system of claim 10, wherein the process further comprises:

calculating a first energy signature for each of the first energy level of the input image, the first energy level of the first reference image and the first energy level of the second reference image; and calculating a second energy signature for each of the second energy level of the input image, the second energy level of the first reference image and the second energy level of the second reference image.

13. The system of claim 12, wherein the process further comprises:

determining, prior to generating the output data, that the first energy signature of the input image is more similar to the first energy signature of the first reference image than the first energy signature of the second reference image.

14. The system of claim 12, wherein the process further comprises:

determining, prior to generating the output data, that the second energy signature of the input image is more similar to the second energy signature of the second reference image than the second energy signature of the first reference image.

15. The system of claim 10, wherein the transforming of the first level of detail of the input image and the transforming of the second level of detail of the input image each further comprise:

calculating the first and second energy levels based on a local signal variation within each of the levels of detail of each of the input image, the first reference image and the second reference image based; and calculating a gain map for each of the first and second levels of detail of the input image based on the respective first and second energy levels, wherein the transforming of the first and second levels of detail of the input image is a function of the gain map.

16. The system of claim 10, wherein the process further comprises:

receiving further input data representing a third reference image;

decomposing each of the input image and the third reference image into a residual based on the further input data; and transforming at least a portion of the residual in the input image based on the residual in the third reference image, wherein the generating of the output data further comprises aggregating the transformed residual of the input image.

17. The system of claim 16, wherein the transforming of at least the portion of the residual in the input image uses at least one of histogram matching and a linear affine transformation.

18. The system of claim 10, wherein the process further comprises:

separating a foreground region of the input image and a background region of the input image based on the input data;

calculating a mean and a standard deviation of a change in the foreground region based on the output data; and transforming the background region by the mean and the standard deviation of the change in the foreground region.

19. A transitory computer program product stored in a non-transitory computer-readable medium having instructions encoded thereon that when executed by one or more computer processors cause the one or more computer processors to perform a process comprising:

receiving input data representing each of an input image, a first reference image and a second reference image, the first reference image and the second reference image being different than each another;

decomposing, based on the input data, each of the input image, the first reference image and the second reference image into a first level of detail and a second level of detail and a corresponding first energy level and second energy level;

transforming the first level of detail of the input image based on the first energy level of the first reference image;

transforming the second level of detail of the input image based on the second energy level of the second reference image; and generating output data representing an output image by aggregating the transformed first level of detail of the input image and the transformed second level of detail of the input image.

20. The computer program product stored in a non-transitory computer-readable medium of claim 19, wherein the transforming of the first level of detail of the input image and the transforming of the second level of detail of the input image each further comprise:

calculating, by the computer processor, the first and second energy levels based on a local signal variation within each of the levels of detail of each of the input image, the first reference image and the second reference image based; and calculating, by the computer processor, a gain map for each of the first and second levels of detail of the input image based on the energy levels for the respective levels, wherein the transforming of the first and second levels of detail of the input image is a function of the gain map.

* * * * *